US009581137B2

(12) United States Patent
Canedo Pardo

(10) Patent No.: US 9,581,137 B2
(45) Date of Patent: Feb. 28, 2017

(54) YAW BRAKES FOR WIND TURBINES

(71) Applicant: ALSTOM RENOVABLES ESPAÑA, S.L., Barcelona (ES)

(72) Inventor: Santiago Canedo Pardo, Barcelona (ES)

(73) Assignee: Alstom Renovables España, S.L., Barcelona (ES)

( * ) Notice: Subject to any disclaimer, the term of this patent is extended or adjusted under 35 U.S.C. 154(b) by 597 days.

(21) Appl. No.: 14/071,454

(22) Filed: Nov. 4, 2013

(65) Prior Publication Data

US 2014/0133983 A1    May 15, 2014

Related U.S. Application Data

(60) Provisional application No. 61/750,706, filed on Jan. 9, 2013.

(30) Foreign Application Priority Data

Nov. 9, 2012    (EP) .................................... 12382443

(51) Int. Cl.
*F03D 7/02*    (2006.01)
*F16D 63/00*    (2006.01)
*F16D 121/00*    (2012.01)

(52) U.S. Cl.
CPC ............ *F03D 7/0244* (2013.01); *F03D 7/0248* (2013.01); *F03D 7/0268* (2013.01); *F16D 63/006* (2013.01); *F16D 2121/005* (2013.01); *Y02E 10/723* (2013.01)

(58) Field of Classification Search
CPC .... F03D 7/0244; F03D 7/0248; F03D 7/0268; F03D 11/0075; F16D 63/004; F16D 63/006; F16D 63/008; F16D 2121/18; F16D 2121/005
See application file for complete search history.

(56) References Cited

U.S. PATENT DOCUMENTS 5,176,267 A    1/1993    Pech
6,199,442 B1 *    3/2001    Bauer ................ B66C 23/94
                                                    188/31

(Continued)

FOREIGN PATENT DOCUMENTS

DE    10 2004 017323    11/2005
EP    0 945 556    9/1999
(Continued)

OTHER PUBLICATIONS

European Search Report for EP12382443, mailed Apr. 18, 2013, 5 pgs.

*Primary Examiner* — Craig Kim
*Assistant Examiner* — Juan G Flores
(74) *Attorney, Agent, or Firm* — Dority & Manning, P.A.

(57) ABSTRACT

Yaw brakes for wind turbines are proposed, the wind turbines having a tower, a nacelle and a yaw system for rotating the nacelle with respect to the tower. The yaw brakes comprise a locking part, having a toothed profile at a side facing a toothed profile of an annular gear of the yaw system. The locking part of the yaw brakes is movable in a radial direction relative to the annular gear, between a brake position and a non-brake position. Brake discs and callipers may be eliminated.

19 Claims, 7 Drawing Sheets

(56) References Cited

U.S. PATENT DOCUMENTS

| | | | | |
|---|---|---|---|---|
| 6,299,829 B1* | 10/2001 | Chichery | ............ | F16D 63/006 |
| | | | | 266/245 |
| 2011/0140442 A1* | 6/2011 | Daniels | ............... | F03D 7/0204 |
| | | | | 290/55 |
| 2011/0171026 A1* | 7/2011 | Kolpin | ................. | F03D 7/0204 |
| | | | | 416/9 |
| 2011/0211961 A1 | 9/2011 | Nies et al. | | |

FOREIGN PATENT DOCUMENTS

| | | |
|---|---|---|
| EP | 1 167 755 | 1/2002 |
| EP | 1 429 025 | 6/2004 |

* cited by examiner

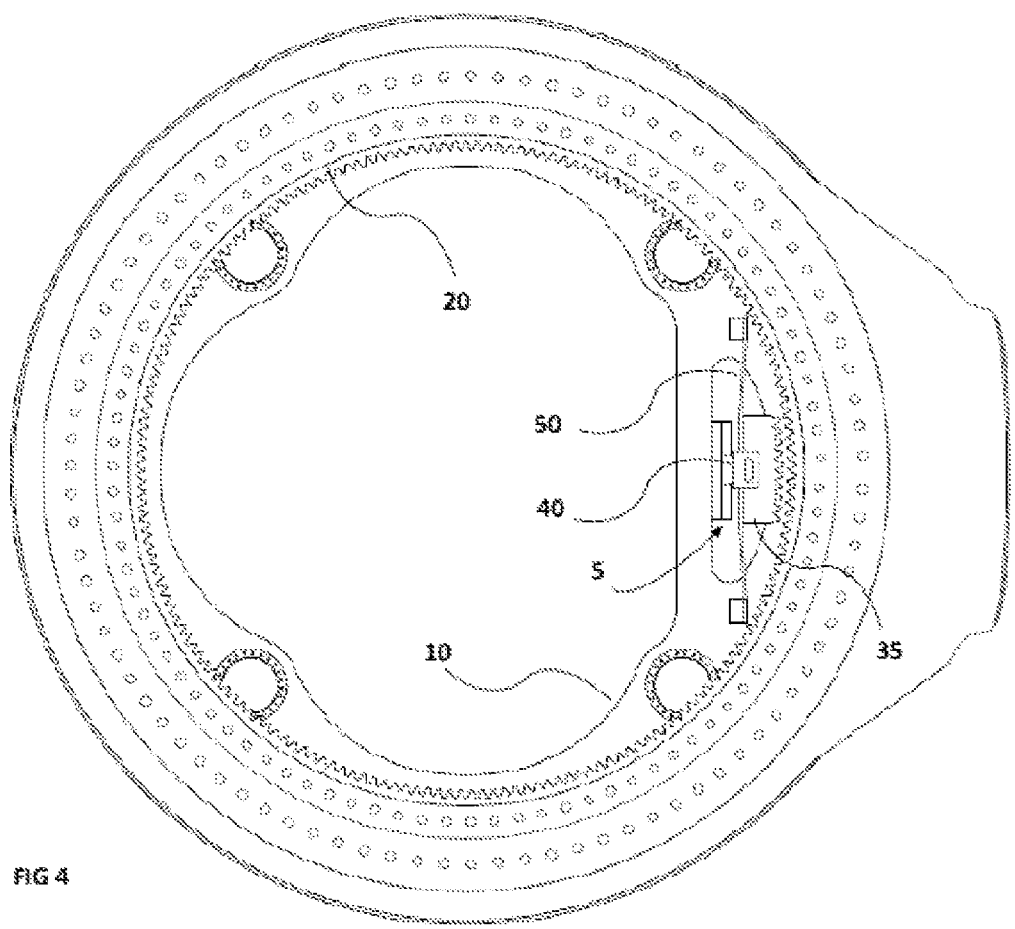

YAW BRAKES FOR WIND TURBINES

This application claims the benefit of European Patent Application No. 12382443.5 filed on Nov. 9, 2012 and U.S. Provisional Patent Application Ser. No. 61/750,706 filed on Jan. 9, 2013, the disclosures of which are hereby incorporated by reference in their entirety for all purposes.

The present invention relates to wind turbines and more specifically to yaw brakes for wind turbines.

BACKGROUND ART

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft, either directly or through the use of a gearbox, to a generator. This way, the generator produces electricity which is supplied into the electrical grid.

Most wind turbines comprise a yaw system used for orienting the rotor of the wind turbine in the prevailing wind direction. Normally, when the rotor is aligned with the wind direction, the yaw system maintains the position by means of brakes (e.g. hydraulic brake callipers and/or electro-brakes of the yaw motors). When the rotor is misaligned from the wind direction the yaw system rotates the nacelle to reach an appropriate alignment with the wind.

The yaw system normally performs this rotation of the nacelle by means of a yaw drive that includes a plurality of (electric or hydraulic) motors with suitable gearboxes for driving gears (pinions) that mesh with an annular gear attached to the nacelle or to the wind turbine tower. The nacelle can thus be rotated around the tower's longitudinal axis in or out of the wind direction. The rotatable connection between the wind turbine tower and the nacelle is called a yaw bearing. The yaw bearing can be of the roller or gliding type and is generally able to handle very high loads.

In order to stabilize the yaw bearing against rotation a means for braking is often necessary.

Such means for braking are known in the prior art. FIG. 1 shows a typical yaw brake system. The yaw brake of FIG. 1 comprises a circular slew bearing 150 (i.e. a yaw bearing) for rotatably mounting the nacelle on the wind turbine tower; an outer ring 130 of the slew bearing is connected with a main frame 160 of the nacelle, and an inner ring 140 is connected to the tower. A hydraulically actuated disk brake may be used to slow rotation of the outer ring. The disk brake typically requires a flat circular brake disk, such as brake disk 120, and a plurality of brake callipers, such as brake callipers 110, with hydraulic pistons and brake pads. The brake disc 120 may be connected to the inner ring 140 of the slew bearing. Brake callipers 110, attached to main frame 160 may engage with brake disc 120 to brake the inner ring 130.

A plurality of yaw drives (not shown) may be provided. The yaw drives comprise a motor, a gearbox (sometimes referred to as a reducer or as reduction gearing), and a pinion which is arranged to engage with annular gear 170. The hydraulic yaw brakes are able to fix the nacelle in position thus relieving the motors from that task. However, the electro-brakes of the yaw drives typically serve to further brake the yaw system.

Considering the azimuth wind direction and the rotor direction, a wind turbine generally operates as follows:

When the wind turbine rotor is aligned with the wind direction it maintains the position usually by means of the yaw brake system involving hydraulic brake callipers and possibly the electro-brakes of the yaw motors.

When the wind turbine rotor is not aligned with the wind direction, the yaw system rotates the nacelle to reach an appropriate alignment with the wind by means of the yaw drives (yaw motor with gearbox and pinion).

In the majority of conventional wind turbines, the hydraulic brake callipers are dimensioned to resist approximately 20% of the maximum aerodynamic load torque. The rest is provided by the motors' electro-brakes.

The main technical problem with this type of solution is that the brake callipers' linings don't have a constant friction coefficient over time. The friction coefficient may be affected e.g. due to wear, temperature, brake disc conditions and undesired contamination (oil or grease). If the friction coefficient increases it may cause a premature failure to the brake callipers themselves. On the other hand, if the friction coefficient decreases it may encumber the gearbox motors and in the worst case it may wear down the annular gear.

Furthermore, brake discs require frequent maintenance which increases the operational cost of the wind turbine. Additionally, the yaw brake may further require electro-brakes in the gearboxes to resist the over torques. This may cause unpredictable damages in the gearboxes. Finally, contamination of the linings may not be avoided completely.

SUMMARY OF THE INVENTION

There is a need for a new yaw brake for a wind turbine that at least partially resolves some of the above mentioned problems. It is an object of the present invention to fulfill such a need.

In a first aspect, a yaw brake is proposed for a wind turbine. The wind turbine may have a tower, a nacelle and a yaw system for rotating the nacelle with respect to the wind tower. The yaw system may comprise a yaw bearing having a first bearing ring (directly or indirectly) attached to the tower, a second bearing ring (directly or indirectly) attached to the nacelle, and an annular gear with a first toothed profile. The yaw system may further comprise a plurality of yaw drives, each having at least a motor and a pinion for meshing with the annular gear. The yaw brake may comprise a locking part with a second toothed profile. The locking part may be movable relative to the annular gear, between a brake position and a non-brake position. The second toothed profile may be negative to the first toothed profile to allow meshing of the locking part with the annular gear when the brake position is desired.

In examples in accordance with this aspect, the proposed yaw brake may resist up to 100% of the maximum torque since no brake callipers are used. Furthermore, no disc brake is used thus the cost of the yaw brake may be reduced. Additionally, the unpredictable damage that may be caused by a failure of electro-brakes in the gearboxes may be avoided as no such electro-brakes are required. Finally, no oil or grease is present in the slew bearing, thus potential contamination may be prevented.

In some implementations, the yaw brake may be movable in a radial direction relative to the annular gear. This may provide efficient meshing of the first toothed profile with the second toothed profile.

In some implementations, the yaw brake may further comprise a piston coupled to the locking part for moving the locking part between the brake position and the non-brake position. The piston may be hydraulic or electromechanical and its shape may be cylindrical or elliptic.

In some implementations, the yaw brake may further comprise at least one deformable beam coupled at to the locking part and to a frame structure. The annular gear may be relatively movable with respect to the frame structure when the nacelle is rotating. The deformable beam may be tangential relative to the annular gear to provide resistance to tangential loads while allowing movement of the locking part between the brake and the non-brake positions. The tangential beam may be placed along a tangent of the annular gear, secured at two areas of a frame structure, the areas being diametrical with respect to the radial axis of movement of the locking part and at the locking part. Alternatively, two tangential beams may be used, each secured at the locking part and at each of two diametrical areas of the frame structure, respectively. The tangential beam or beams may be used to provide resistance to tangential loads while allowing radial movement of the locking part. As the locking part may be expected to be in a brake position most of the time, the tangential beam or beams may be arranged so that they are in a non-deformable state when the yaw brake is in the brake position and in a non-deformable state when the yaw brake is in the non-brake position. In that way, the deformable beam or beams may be under less stress most of the time.

In some implementations, the yaw brake may comprise a guiding system attached to a frame structure to allow movement of the locking part between the brake and the non-brake positions.

In some implementations, the side of the locking part facing the annular gear has a portion with a curvature substantially corresponding to the curvature of the annular gear. This allows better meshing of the toothed part of the locking part with the toothed part of the annular gear. A curved toothed profile maximises the meshing efficiency, and thus braking efficiency, of the brake.

In some implementations, the first toothed profile may be facing outwards from the annular gear and the yaw brake may be placed in the exterior of the gear ring and vice versa.

In some implementations, the annular gear may be fixed with respect to the wind tower and the yaw brake may be attached to the nacelle. In other examples, the annular gear may be fixed with respect to the nacelle and the yaw brake may be attached directly or indirectly to the wind tower. It is understood that the purpose of the yaw brake is to brake the relative motion between the nacelle and the tower, irrespective of whether the annular gear and the nacelle rotate in unison or whether the annular gear remains static, while the nacelle rotates.

In some implementations, the yaw brake may further comprise a controller coupled to the piston, for actuating the piston to move the locking part to the brake position when the orientation of the wind turbine is the desired orientation. The controller may be a dedicated controller or may be part of a yaw system controller or part of the wind turbine control system.

In another aspect, a wind turbine is proposed comprising a yaw brake according to any of the aforementioned embodiments.

BRIEF DESCRIPTION OF THE DRAWINGS

Particular embodiments of the present invention will be described in the following by way of non-limiting examples, with reference to the appended drawings, in which:

FIG. 4 is a cross section of the yaw system having a yaw brake according to another example in a non-brake position;

DETAILED DESCRIPTION OF EMBODIMENTS OF THE INVENTION

In the following description, numerous specific details are set forth in order to provide a thorough understanding of the present invention. It will be understood by one skilled in the art however, that the present invention may be practiced without some or all of these specific details. In other instances, well known elements have not been described in detail in order not to unnecessarily obscure the description of the present invention.

Figure 1:
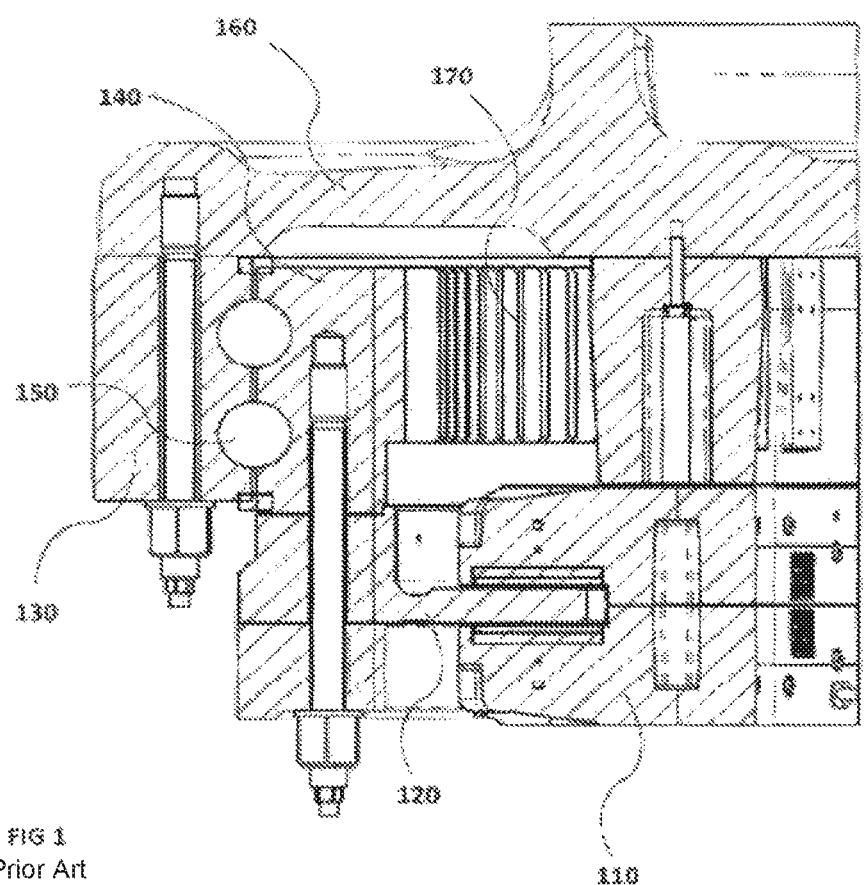
FIG. 1 is a cross section of a typical prior art yaw brake with brake callipers.
Figure 2A:
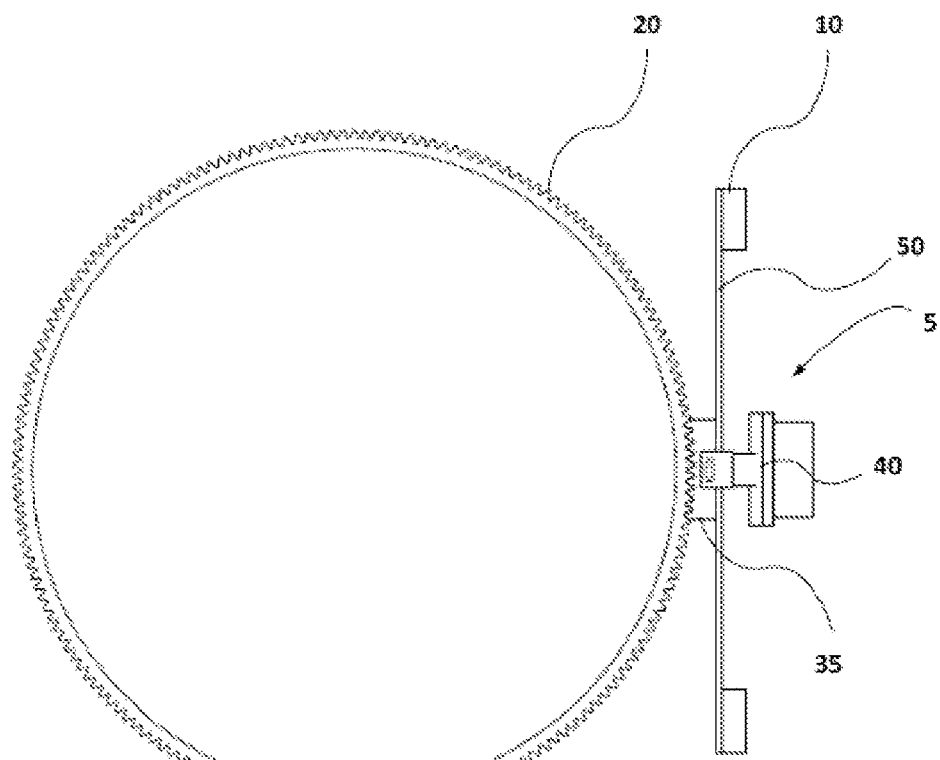
FIGS. 2A and 2B schematically illustrate a detail of a yaw system having a yaw brake according to an example in a brake and in a non-brake position, respectively.
Figure 2B:
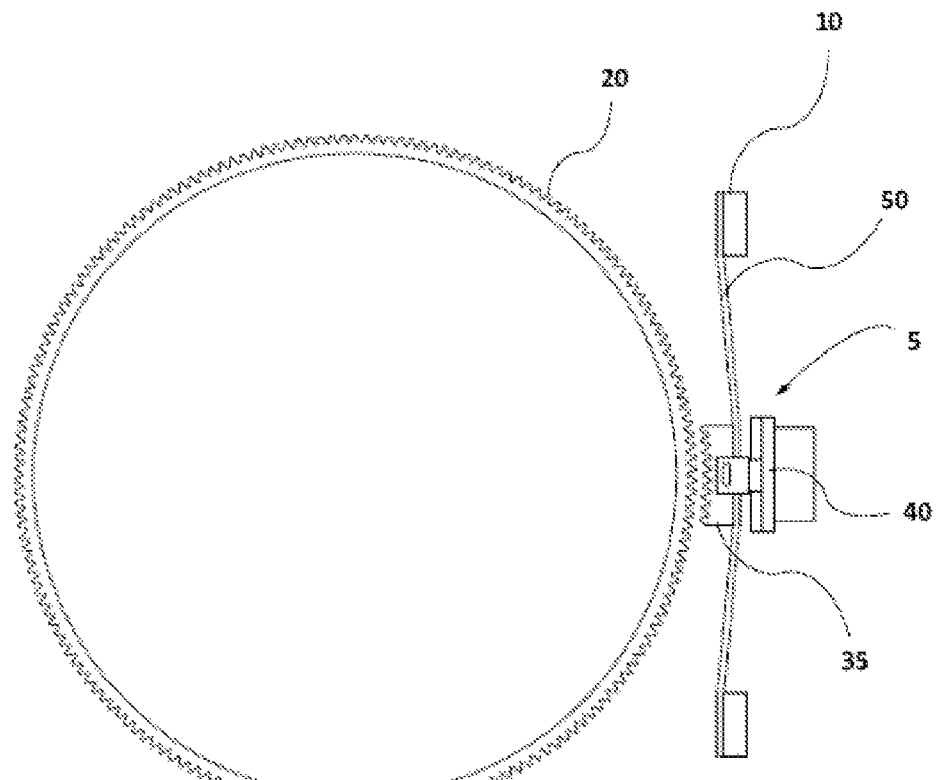

FIGS. 2A and 2B schematically illustrate a detail of a yaw system having a yaw brake according to an embodiment in brake and non-brake position, respectively; In particular, FIG. 2A shows a yaw brake 5, according to an example, actuating on a circular annular gear 20. FIG. 2B shows yaw brake 5 in a non-brake position, i.e. while the nacelle is rotating.

Yaw brake 5 includes a locking part 35, a piston 40 and a tangential beam 50. Locking part 35 has a negative toothed profile with respect to the tooth profile of annular gear 20. As a result, the toothed profile of the locking part may mesh with the toothed profile of the annular gear to provide a brake position. In this brake position, no relative movement between locking part 35 and annular gear 20 is possible. As a consequence, no relative movement between the nacelle and the tower is possible.

Yaw brake 5 further includes a piston 40 to provide the necessary radial movement of locking part 35. The piston effectively pushes against beam 50 and thereby deforms it. Tangential beam 50 is in a non-deformed state when the yaw brake is in the brake position, as shown in FIG. 2A, and in a deformed state when the yaw brake is in the non-brake position, as shown in FIG. 2B.

In this example, yaw brake 5 is fixed to frame structure 10 at three points. The two points are the edges of tangential beam 50 and the third point is the posterior side of piston 40. Tangential beam 50 allows the radial movement of locking part 35 but resists the tangential loads associated with the relative rotation of bearing ring 20. Now, bearing ring 20 is in relative motion with respect to frame structure 10 when the nacelle rotates. There are two possibilities: either the annular gear is fixed, e.g. on the wind turbine tower, whereby the frame structure rotates with the nacelle; or the annular gear rotates with the nacelle, whereby the frame structure is fixed directly or indirectly to the wind turbine tower. In the first case, the frame structure may be the main frame of the nacelle.

Figure 3:
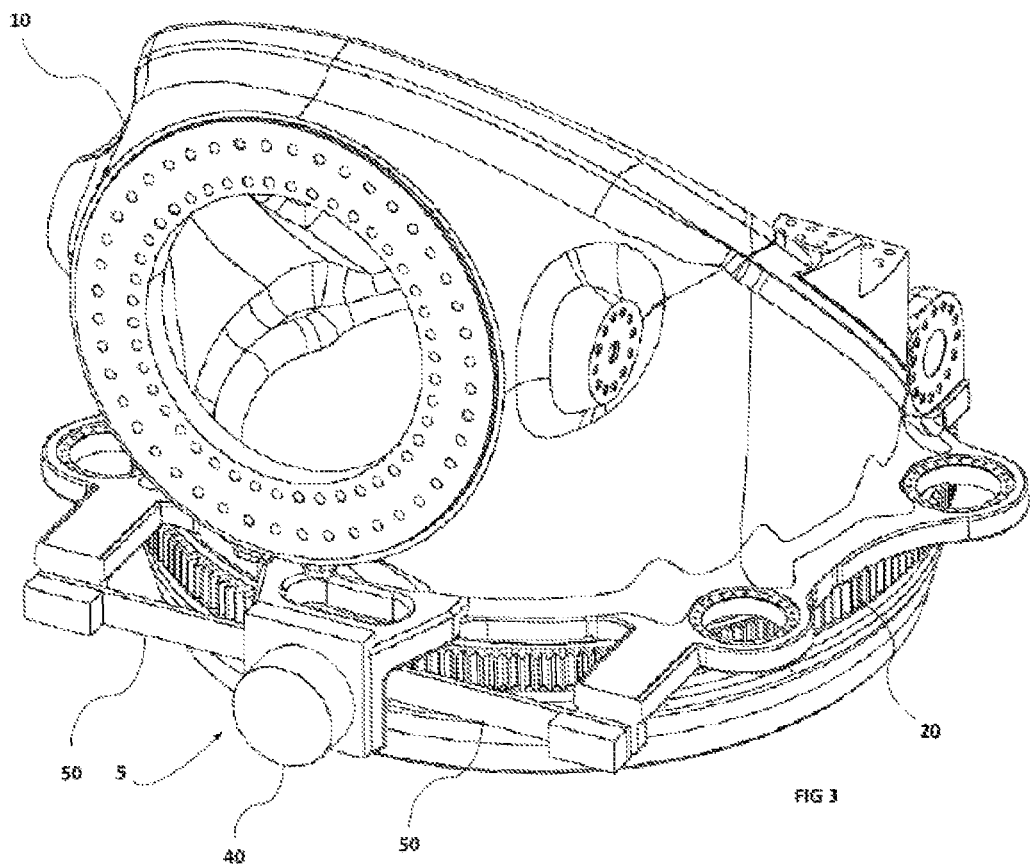
FIG. 3 schematically represents a perspective view of a yaw system having a brake according to an example.

FIG. 3 schematically represents a perspective view of a yaw system having a brake according to another example.

The yaw system comprises a main frame 10, a yaw brake 5 and a circular annular gear 20. The yaw brake may further comprise a piston 40 and tangential beam 50. The yaw brake 5 may be fixed on main frame 10. This configuration implies that the circular bearing ring 20 is fixed, e.g. on the wind turbine tower, and on the other hand, the nacelle, the main frame, and the yaw brake rotate in unison around the main axis of the wind turbine.

In the illustrated example, the annular gear is arranged on an external circumference of the tower. A plurality of annular orifices shown around the main frame is used for accommodating a plurality of yaw drives. Each of the yaw drives may comprise a motor and gearbox and a pinion for meshing with the annular gear. The yaw drives can be activated when it is required or desired to rotate the main frame and, thus, the nacelle.

Figure 3A:
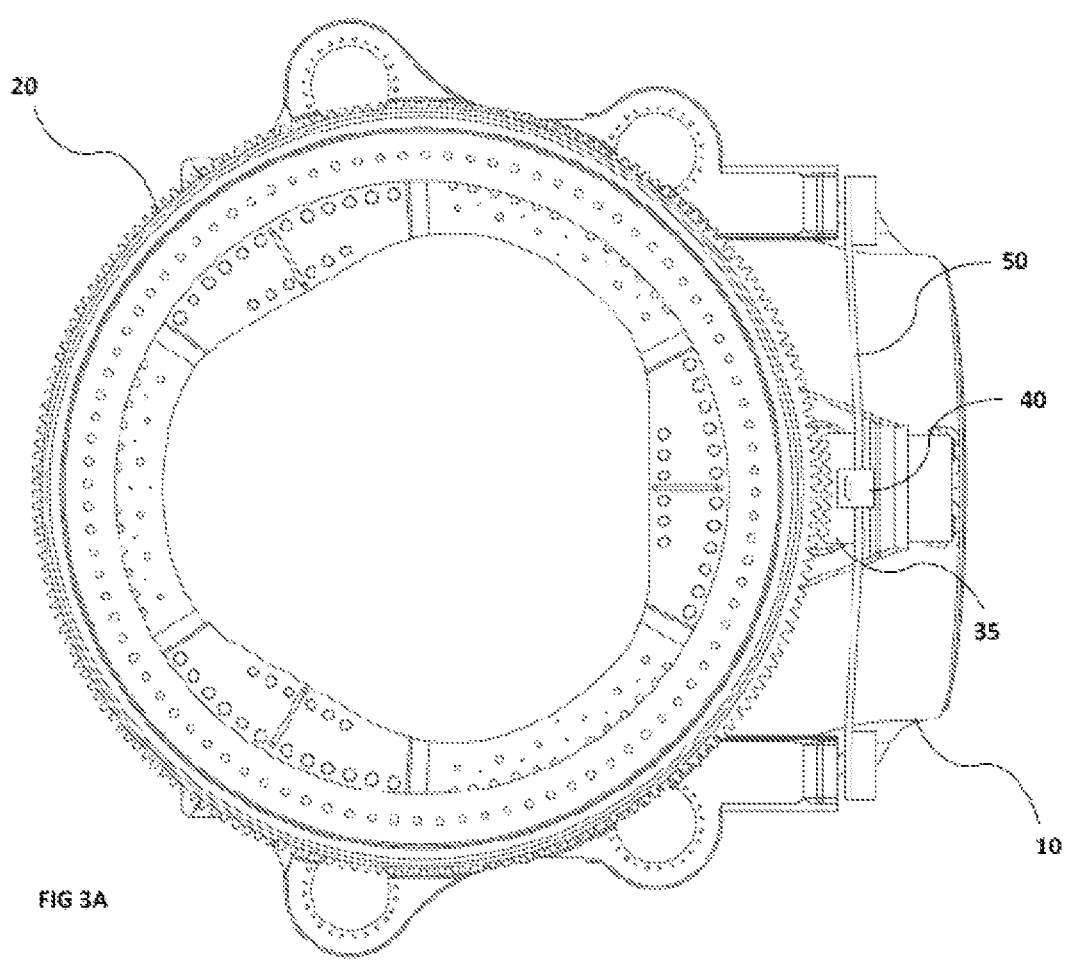
FIG. 3A is a cross section of the yaw system of FIG. 3 in a non-brake position.
Figure 3B:
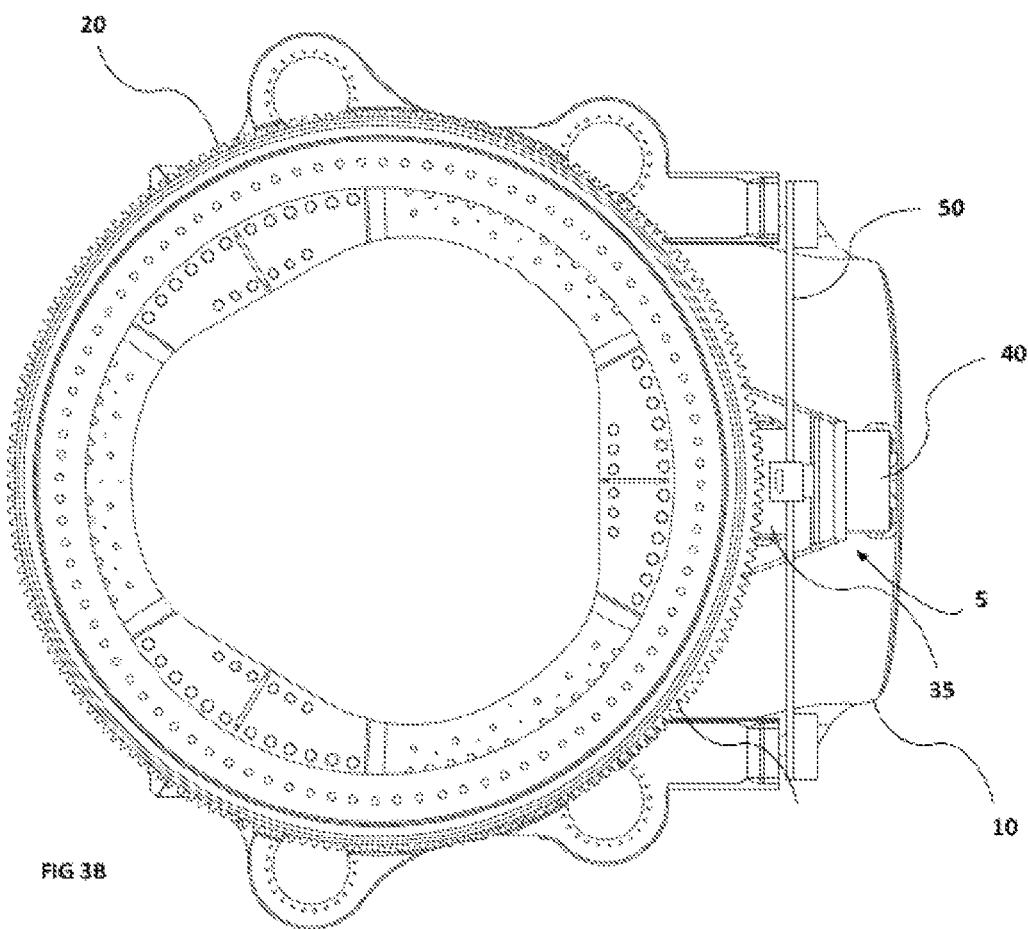
FIG. 3B is a cross section of the yaw system of FIG. 3 in a brake position.

FIGS. 3A and 3B illustrate cross sections of the yaw system of FIG. 3 in a non-brake position and in a brake position, respectively; as shown before, the yaw system comprises the main frame 10, the yaw brake 5 and annular gear 20. The yaw brake comprises a locking part 35, a piston 40 and tangential beams 50. Tangential beam 50 is in a non-deformed state (i.e. substantially straight) when the yaw brake is in the brake position, as shown in FIG. 3A, and in a deformed state when the yaw brake is in the non-brake position, as shown in FIG. 3B. The yaw brake 5 may be fixed on main frame 10.

Locking part 35 is shown in FIG. 3A in a withdrawn position, i.e. the toothing profile of locking part 35 is not meshing with the toothing profile of the circular annular gear 20, corresponding to a non-brake position of the yaw brake. Accordingly, locking part 35 is shown in FIG. 3B in an engaging position, i.e. the toothing profile of locking part 35 is meshing with the toothing profile of the annular gear 20, corresponding to a brake position of yaw brake 5. At least a portion of the toothed profile may be curved in a concave manner to account for the curvature of the external toothing profile of the bearing ring.

During operation, yaw brake 5 is normally in the brake position. When the wind direction changes, the orientation of the nacelle may be required to be changed as well. As a consequence, the wind turbine controller instructs yaw brake 5 to disengage. Piston 40 pulls locking part 35 from annular gear 20. When locking part 35 is sufficiently removed from annular gear 20, the motor pinions of the yaw drive mesh with annular gear 20, causing the nacelle to rotate. When the nacelle is at a desired orientation, the wind turbine controller instructs yaw brake 5 to re-engage. As a result, piston 40 pushes locking part 35 until it meshes with annular gear 20. As a result, yaw brake 5 causes the nacelle to brake until it comes to a stop and no further movement of the nacelle is possible due to the rotation of the blades.

It may be seen in the figures in the illustrated examples, that the tangential beam 50 is deformed in the non-locking position and substantially straight (in its natural shape) in a locking position. This arrangement is generally preferred, because during most of the lifetime of a wind turbine, the yaw brake will be in a brake position. However, an alternative arrangement wherein the beam is straight in the non-locking position could also be used if desired.

FIG. 4 is a cross section of the yaw system having a yaw brake according to another embodiment in a non-brake position; The yaw system comprises a main frame 10, a yaw brake 5 and a circular annular gear 20. The yaw brake comprises a locking part 35, a piston 40 and tangential beam(s) 50. In this implementation, the toothed profile of annular gear 20 is internal. Consequently, yaw brake 5 is placed in the interior of annular gear 20. It is fixed on main frame 10 which has been adapted to host yaw brake 5. The toothed profile may be curved in a convex manner to account for the curvature of the internal toothing profile of the bearing ring.

Figure 5:
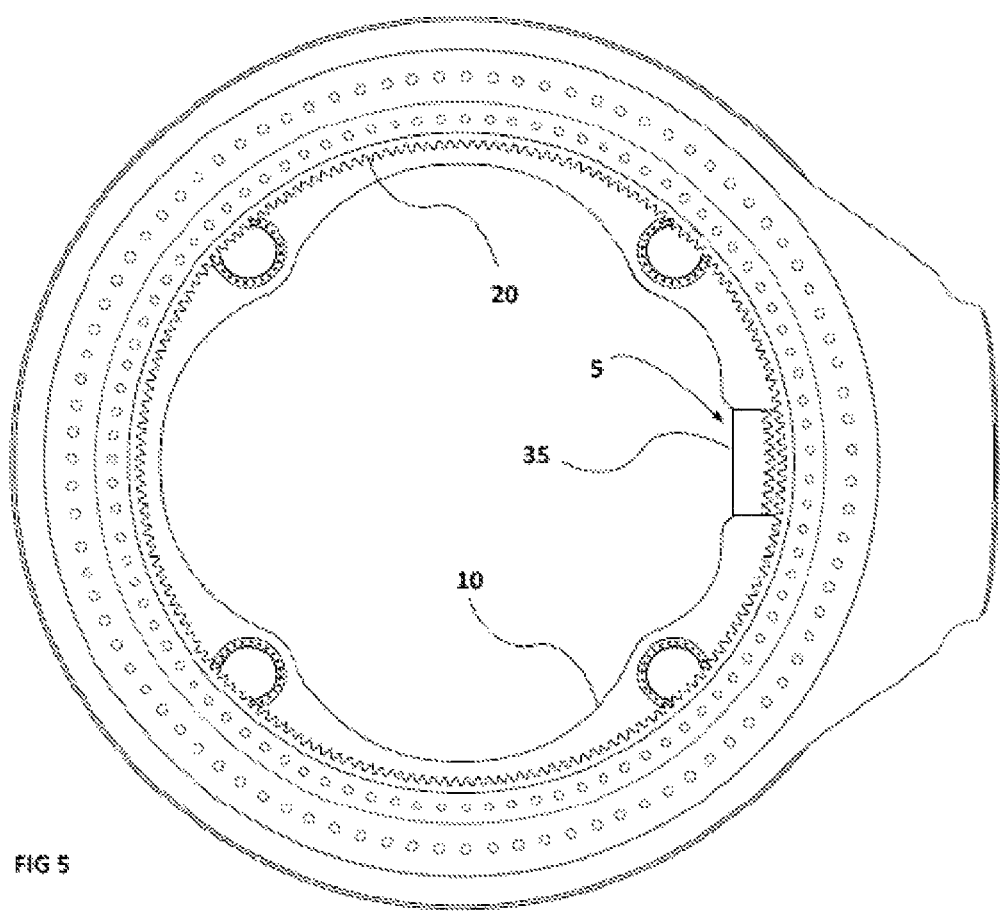
FIG. 5 is a cross section of the yaw system having a yaw brake according to yet another example in a non-brake position.

FIG. 5 is a cross section of the yaw system having a yaw brake in a non-brake position according to yet another example. The yaw system in this example comprises frame structure 10, a yaw brake 5 and a circular annular gear 20. The yaw brake comprises a locking part 35. In this implementation, the toothed profile of annular gear 20 is also internal, as in the embodiment of FIG. 4. Consequently, yaw brake 5 is placed again in the interior of annular gear 20. However, instead of the tangential beam(s) of the previous implementations, a guiding system is cast in the adapted frame structure. The locking part may slide along this guiding system towards engagement or out of engagement with the annular gear.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A yaw system for a wind turbine, the wind turbine having a tower and a nacelle, the yaw system being adapted for rotating the nacelle about a yaw axis with respect to the tower, the yaw system comprising:
    a yaw bearing having a first bearing ring configured for being attached to the tower, a second bearing ring configured for being attached to the nacelle, and an annular gear with a first toothed profile;
    a plurality of yaw drives, each having at least a motor and a pinion for meshing with the annular gear;
    a yaw brake comprising a locking part with a second toothed profile, the locking part being movable relative to the annular gear between a brake position and a non-brake position, the second toothed profile being negative to the first toothed profile to allow meshing of the locking part with the annular gear when the brake position is desired; and
    a deformable beam attached to a frame structure, the annular gear rotatable relative to the frame structure when the nacelle is rotating about the yaw axis, and the locking part coupled to the deformable beam, wherein the deformable beam moves the locking part between the brake position and the non-brake position.

2. The yaw system according to claim 1, wherein the locking part is movable in a radial direction relative to the annular gear.

3. The yaw system according to claim 1, further comprising a piston coupled to the locking part for moving the locking part and deformable beam between the brake position and the non-brake position.

4. The yaw system according to claim 3, wherein the piston is hydraulic or electromechanical.

5. The yaw system according to claim 1, wherein the deformable beam is tangential relative to the annular gear to provide resistance to the tangential loads while allowing movement of the locking part between the brake and the non-brake position.

6. The yaw system according to claim 1, wherein the deformable beam is in a non-deformed state when the yaw brake is in the brake position and in a deformed state when the yaw brake is in the non-brake position.

7. The yaw system according to claim 1, further comprising a guiding system attachable to a frame structure to allow movement of the locking part between the brake and the non-brake position.

8. The yaw system according to claim 1, wherein a side of the locking part facing the annular gear has a portion with a curvature substantially corresponding to the curvature of the annular gear.

9. The yaw system according to claim 1, wherein the first toothed profile is facing outwards from the annular gear and the yaw brake is placed exterior of the annular gear.

10. The yaw system according to claim 1, wherein the first toothed profile is facing inwards to the annular gear and the yaw brake is placed in the interior of the annular gear.

11. The yaw system according to claim 1, wherein the annular gear is configured for being fixed relative to the wind tower and the yaw brake is configured for being attached to the nacelle.

12. The yaw system according to claim 1, wherein the annular gear is configured for being fixed relative to the nacelle and the yaw brake is configured for being attached to the wind tower.

13. The yaw system according to claim 1, further comprising a controller for actuating the locking part to the brake position when the orientation of the wind turbine is a desired orientation.

14. A wind turbine comprising a yaw system according to claim 1.

15. A yaw brake for a wind turbine having a tower, a nacelle and a yaw system for rotating the nacelle about a yaw axis with respect to the tower, the yaw brake comprising:
 an annular gear with a first toothed profile,
 a locking part, with a second toothed profile, movable relative to the annular gear, between a brake position and a non-brake position,
 the second toothed profile being negative to the first toothed profile to allow meshing of the locking part with the annular gear when the brake position is desired; and
 a deformable beam, the locking part coupled to the deformable beam, wherein the deformable beam moves the locking part between the brake position and the non-brake position.

16. A yaw system comprising the yaw brake according to claim 15, the yaw system comprising
 a yaw bearing having a first bearing ring configured for being attached to a wind turbine tower,
 a second bearing ring configured for being attached to a wind turbine nacelle, and
 a plurality of yaw drives, each having at least a motor and a pinion for meshing with the annular gear.

17. A wind turbine comprising the yaw brake according to claim 15.

18. The yaw brake according to claim 15, wherein the annular gear is configured for being fixed relative to the wind tower and the locking part is configured for being attached to the nacelle.

19. The yaw brake according to claim 15, wherein the annular gear is configured for being fixed relative to the nacelle and the locking part is configured for being attached to the wind tower.

* * * * *